(12) United States Patent
Broman et al.

(10) Patent No.: US 8,976,056 B2
(45) Date of Patent: Mar. 10, 2015

(54) ICE DATA COLLECTION, PROCESSING AND VISUALIZATION SYSTEM

(71) Applicants: Rolf Christer Broman, Houston, TX (US); Dominique P. Berta, Katy, TX (US); Khalid A. Soofi, Katy, TX (US); Peter G. Noble, Spring, TX (US)

(72) Inventors: Rolf Christer Broman, Houston, TX (US); Dominique P. Berta, Katy, TX (US); Khalid A. Soofi, Katy, TX (US); Peter G. Noble, Spring, TX (US)

(73) Assignee: ConocoPhillips Company, Houston, TX (US)

( * ) Notice: Subject to any disclaimer, the term of this patent is extended or adjusted under 35 U.S.C. 154(b) by 239 days.

(21) Appl. No.: 13/654,503

(22) Filed: Oct. 18, 2012

(65) Prior Publication Data
US 2013/0099960 A1 Apr. 25, 2013

Related U.S. Application Data

(60) Provisional application No. 61/550,010, filed on Oct. 21, 2011.

(51) Int. Cl.
*G01S 13/86* (2006.01)
*G01S 13/90* (2006.01)
(Continued)

(52) U.S. Cl.
CPC .............. *G01S 13/862* (2013.01); *G01S 15/88* (2013.01); *G01S 13/90* (2013.01)
USPC .................. 342/26 A; 73/170.16; 73/170.26; 73/170.28; 73/170.29; 367/87; 367/93; 367/94; 367/99; 367/107; 367/117; 342/25 R; 342/25 A; 342/26 R; 342/27; 342/28; 342/52; 342/175; 342/176; 342/179; 342/181; 342/195

(58) Field of Classification Search
CPC ....... G01S 13/86; G01S 13/862; G01S 13/88; G01S 13/89; G01S 13/90; G01S 13/95
USPC ........ 342/21, 22, 25 R–26 D, 27, 28, 52, 175, 342/176, 179, 181, 189, 192–197; 367/87–116, 117; 73/170.01, 170.16, 73/170.26, 170.28, 170.29, 170.33
See application file for complete search history.

(56) References Cited

U.S. PATENT DOCUMENTS 3,267,416 A * 8/1966 Morse .......................... 367/115
4,287,472 A 9/1981 Pan et al.
(Continued)

FOREIGN PATENT DOCUMENTS

| CA | 1269148 | 3/1987 | |
|---|---|---|---|
| GB | 2223642 | 10/1988 | |
| WO | WO03/048803 A1 * | 6/2003 | .............. G01S 13/89 |

OTHER PUBLICATIONS

Malinas, N. P. et al., "SAR Derived Sea Ice Thickness During ICEX'92"; "IGARSS '94. International Geoscience and Remote Sensing Symposium. Surface and Atmospheric Remote Sensing: Technologies, Data Analysis and Interpretation"; Cat. No. 94CH3378-7; pp. 1756-1758; IEEE; New York, NY, USA; 1994.*
(Continued)

*Primary Examiner* — Bernarr Gregory
(74) *Attorney, Agent, or Firm* — ConocoPhillips Company

(57) ABSTRACT

Autonomous Underwater Vehicles (AUV) collect and transmit information about ice floe thickness; this is combined with SYNTHETIC APERTURE RADAR images from satellites to identify and track dangerously thick regions of ice. The overlayed data is presented graphically to allow tracking of the thick ice regions over time. This information is used to alert drilling platforms in icy ocean conditions of pending ice floe dangers.

12 Claims, 5 Drawing Sheets

(51) Int. Cl.
  *G01S 13/95* (2006.01)
  *G01S 15/89* (2006.01)
  *G01S 15/88* (2006.01)
  *G01S 13/00* (2006.01)
  *G01S 15/00* (2006.01)

(56) References Cited

U.S. PATENT DOCUMENTS

| | | | |
|---|---|---|---|
| 4,680,961 A | | 7/1987 | Grauman et al. |
| 4,924,698 A | | 5/1990 | Echert et al. |
| 5,122,990 A | | 6/1992 | Deines et al. |
| 5,209,112 A | * | 5/1993 | McCoy et al. ............ 73/170.01 |
| 5,381,694 A | | 1/1995 | Glynn et al. |
| 5,579,285 A | | 11/1996 | Hubert |
| 5,583,972 A | | 12/1996 | Miller |
| 5,585,799 A | | 12/1996 | Yankielun et al. |
| 6,317,385 B1 | | 11/2001 | Hedgepeth |
| 6,683,609 B1 | | 1/2004 | Baron, Sr. et al. |
| 6,700,528 B2 | | 3/2004 | Williams et al. |
| 7,095,359 B2 | | 8/2006 | Matsuoka et al. |
| 7,693,348 B2 | | 4/2010 | Zavadsky et al. |
| 2004/0143395 A1 | | 7/2004 | Matsuoka et al. |
| 2007/0219833 A1 | | 9/2007 | Trautman |
| 2008/0123996 A1 | | 5/2008 | Zavadsky et al. |
| 2008/0300790 A1 | | 12/2008 | Kakaire |
| 2009/0271054 A1 | | 10/2009 | Dokken |
| 2010/0142324 A1 | | 6/2010 | Vogt |

OTHER PUBLICATIONS

Nakamura, Kazuki et al., "Observation of Sea-Ice Thickness in the Sea of Okhotsk by Using Dual-Frequency and Fully Polarimetric Airborne SAR (Pi-SAR) Data"; "IEEE Transactions on Geoscience and Remote Sensing"; vol. 43, No. 11; Nov. 2005.*
PCT/US2012/060756 PCT International Search Report (PCT/ISA/210) Dated Jun. 19, 2013.
Mohr J.J., Madsen S.N., 1996: Application of Interferometry to Studies of Glacier Dynamics. In: Proc. IGARSS'96 Symp., pp. 972-974.
Joughin, Ian, Kwok, Ron "Interferometric Study of the Ice Stream in Interior Northeast Greenland" http://earth.esa.int/workshops/ers97/papers/fahnestock/, Year 1997.
Haverkamp, Donna, Tsatsoulis, Costas "Information Fusion for Estimation of Summer MIS Ice Concentration form SAR Imagery" IEEE Transactions on Geoscience and Remote Sensing, vol. 37, No. 3, May 1999.
Jian, Fan, Liu, Shi, Wang, Xueyao "Measurement of Ice Movement in Water Using Electrical Capacitance Tomography" Journal of Thermal Science, ISSN 1003-2169, vol. 18, No. 1, Mar. 2009 Cuntz Nicolas, Leidl martin.
"GPU Based Dynamic Flow Visualization for Climate Research Applications" http://www.cg.informatik.uni-siegen.de/data/Publications/2007/cuntz07climate.pdf, Year 2007.
Harms, et al., "AWI moored ULS data, Weddell Sea (1990-1998)." Boulder, CO: National Snow and Ice Data Center/World Data Center for Glaciology (2001).
Hyatt, et al., "Estimating sea-ice coverage, draft, and velocity in Marguerite Bay (Antarctica) using a subsurface moored upward-looking acoustic Doppler current profiler (ADCP)," Deep Sea Research Part II: Topical Studies in Oceanography, 55:351-64 (2008). http://dx.doi.org/10.1016/j.dsr2.2007.11.004.
Strass, "Measuring sea ice draft and coverage with moored Upward Looking Sonar's," Deep-Sea Res, I 45:795-818 (1998). doi:10.1016/S0967-0637(97)00065-4.
Wadhams, et al., "A new view of the underside of Arctic sea ice," Geophys. Res. Lett., 33, L04501, doi:10.1029/2005GL025131. (2006).
Theriault, et al., "Survey of Active Acoustic Monitoring (AAM) Technologies." Int'l Assoc. Oil & Gas Prod. (OGP) 1: (2009).
Andersen P.H., Hauge S., Kristiansen O., 1995b: Precise ERS-1 orbit calculation. Bulletin Geodesique, vol. 69, pp. 192-199, Year 1995.
Eldhuset K., 1996b: Accurate attitude estimation using ERS-1 SAR raw data . International Journal of Remote Sensing, vol. 17,No. 14, pp. 2827-2844, Year 1996.
Eldhuset K., 1996d: An automatic Ship and Ship Wake Detection System for Spaceborne SAR Images in Coastal Regions. IEEE Trans. On Geosc. and Remote Sensing, vol. 34, No. 4, pp. 1010-1019, Year 1996.
Goldstein R.M., Engelhardt H., Kamb B., Frolich R.M., 1993: Satellite Radar Interferometry for Monitoring Ice Sheet Motion: Application to an Antarctic Ice Stream. Science , vol. 262, pp. 1525-1529.
Kwok R., Fahnestock M.A., 1996: Ice Sheet Motion and Topography from Radar Interferometry. IEEE Trans. on Geosc. And Remote Sensing, vol. GRS-34, No. 1, pp. 189-200.
Lefauconnier B., Hagen J.O., Rudant J.P., 1994: Flow speed and calving rate of Kronebreen glacier, Svalbard, using SPOT images. Polar Research, vol. 13, No. 1, pp. 189-200.

* cited by examiner

ICE DATA COLLECTION, PROCESSING AND VISUALIZATION SYSTEM

CROSS-REFERENCE TO RELATED APPLICATIONS

This application is a non-provisional application which claims benefit under 35 USC §119(e) to U.S. provisional application Ser. No. 61/550,010 filed Oct. 21, 2011, entitled "Ice Data Collection, Processing and Visualization System," which is hereby incorporated by reference.

FIELD OF THE INVENTION

This invention relates to systems for detecting, characterizing and tracking ocean ice floes, in particular by gathering and analyzing ice floe data.

BACKGROUND OF THE INVENTION

Because the demand for oil and gas continues to grow, safer and more reliable methods of developing oil and gas fields need to be developed. Producing gas from the Arctic Ocean provides unique challenges, especially as drilling moves into deeper water depths, faces more severe ice conditions, and as well complexity increases.

Ice floe detection has been developed using a variety of ice monitoring systems. Strass (1998) derives ice draft and coverage from acoustic measurements made with moored UPWARD LOOKING Sonar's (ULS') sounding the sea surface remotely from below. Harms, et al., (2001) use moored ULS data to measure sea ice draft. Wadhams, et al. (2006) developed an autonomous underwater vehicle (AUV) for under-ice studies with an unmanned under-ice vehicle and a multibeam sonar. Hyatt, et al. (2008) use upward-looking acoustic Doppler current profiler (ADCP) to determine ice coverage with moored systems. (Theriaul, et al., 2009).

Johnson, GB2223642, describes methods of tracking the movement of sea-ice using successive images from orbiting satellites. Deines and Maier, U.S. Pat. No. 5,122,990, indicate that a signal echo may be used in an upward looking configuration to measure the movement of sheets of ice in one of the Polar Regions. Glynn, et al., U.S. Pat. No. 5,381,694, provides a relatively inexpensive reflectometer apparatus that can measure the thickness of material such as ice. Yankielun and Ferrick, U.S. Pat. No. 5,585,799, pertains to a microwave continuous wave (CW) Doppler radar system for river ice motion detection and real-time kinematic data acquisition using digital signal processing equipment. Matsuoka, et al., U.S. Pat. No. 7,095,359, describe an ice thickness/drifting velocity observation of sea ice by using an ice thickness measurement sonar and a current meter moored into the sea and a sea ice observation by a high-resolution airborne SAR are synchronously performed to calculate a correlation between a draft profile of sea ice passing over the sonar and an SAR backscattering coefficient profile. Williams and Yankielun, U.S. Pat. No. 6,700,528, provide a compact and relatively inexpensive motion detection and alerting system implemented in a single, environmentally secure and benign package. Although a variety of ice floe monitoring equipment has been developed, these systems are limited to small areas, fixed positions within the ocean or near the equipment, or limited in the amount of time available.

Oil and gas companies wishing to drill and develop an oil or gas field in the offshore Arctic Ocean need to know on a near continuous basis what kind of ice environment they are dealing with. In the Alaska and Beaufort Canadian areas of the Arctic Ocean, the ice is usually composed of "floes", large bodies of ice that may extend up to several hundred square miles in area and 100 feet in thickness. These floes move around in a somewhat erratic and unpredictable fashion. Although satellite imaging can be used to track ice floes on a near-continuous basis and predict with certain probabilities where they are heading, as well as measuring their area in the x and the y direction (FIG. 1), the third dimension, the thickness of the ice floe, cannot be measured satisfactorily. What is required is a method to measure and monitor on a continuous basis large areas of the ice floes including details of the under-ice topography, in particular the thickness of the ice.

Thick regions of ice can be created when floes collide and overlap or stack, or alternatively by so-called multi-year ice, that is to say floes which endure year on year and whose thickness accumulates over the years. The former sort is less dangerous, being generally weaker and easier to break up; the latter sort tends to be stronger and therefore more dangerous.

BRIEF SUMMARY OF THE DISCLOSURE

The invention relates to the combined use of satellite SAR imagery and underwater UPWARD LOOKING SONAR (ULS). ULS can identify under-ice topography, in particular thickness, but is not well suited for tracking movement of ice. SAR cannot determine ice thickness, but is well suited for tracking movement and development of floes. By correlating the two types of data, thick (and therefore potentially dangerous) regions of ice may be identified and tracked.

A system for monitoring ice floe movement may include: (a) a satellite based system for acquiring SYNTHETIC APERTURE RADAR (SAR) images of ice floes; (b) an underwater UPWARD LOOKING SONAR (ULS) system for acquiring ice thickness data; and (c) a control unit for receiving said SAR images and said thickness data and for correlating said images and data in time and space.

Said ULS system may be a single beam system, or alternatively may be a multi-beam system.

Said ULS system may be located in one or more underwater buoys or in one or more autonomous underwater vehicles.

Said control unit may be capable of tracking movement of hazardous ice floes, using updated image data and, optionally, updated thickness data.

At least one of said thickness and image data may be updated at least every six hours, optionally at least every four hours or less.

A process for monitoring ice floe movement may include: (a) receiving ice floe image data from a satellite based SAR system; (b) receiving ice thickness data from an underwater ULS system; and (c) correlating said ice flow image data and said thickness data in time and space.

The process may including identifying hazardous ice floes having areas of a thickness which may present a risk and tracking movement of said floes using updated image data and, optionally, updated thickness data.

Once an ice floe has been identified which is deemed potentially dangerous based on image and thickness data, the control system may store the image and track movement of the floe by recognizing the image of the area in successive SAR data. The updated location may be fed back to the underwater ULS system which may reassess the thickness of the ice in the tracked area, e.g. to determine whether it has changed and whether the floe still presents a potential risk.

In this way, the three main characteristics indicative of whether a floe or an area of ice is dangerous, namely size in the x-y plane, speed and thickness, may be monitored by a single system on a continuously updated basis.

The ULS system may involve, for example, a buoy permanently tethered to a rig. This kind of system has the advantage that it can be powered from the rig and does not need to use batteries. Alternatively, one or more autonomous underwater vehicles (AUV's) could be used for obtaining the ULS data; this is much more flexible since the AUV can travel to areas of ice which may pose a danger; however, AUV's rely on batteries which require recharging and also collection of data by this method involves a delay while the AUV returns to its docking station to download its data.

The data from ULS and SAR may be combined in a single display to allow direct visualization of the movement of ice floes having areas with more than a threshold thickness which may be deemed to present a risk. The display may comprise overlayed images representing data from ULS and SAR respectively. The display may comprise images from SAR with one or more areas indicated by color, shading or other means as being an area in which the ice may be more than a threshold thickness which may be deemed to present a risk.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
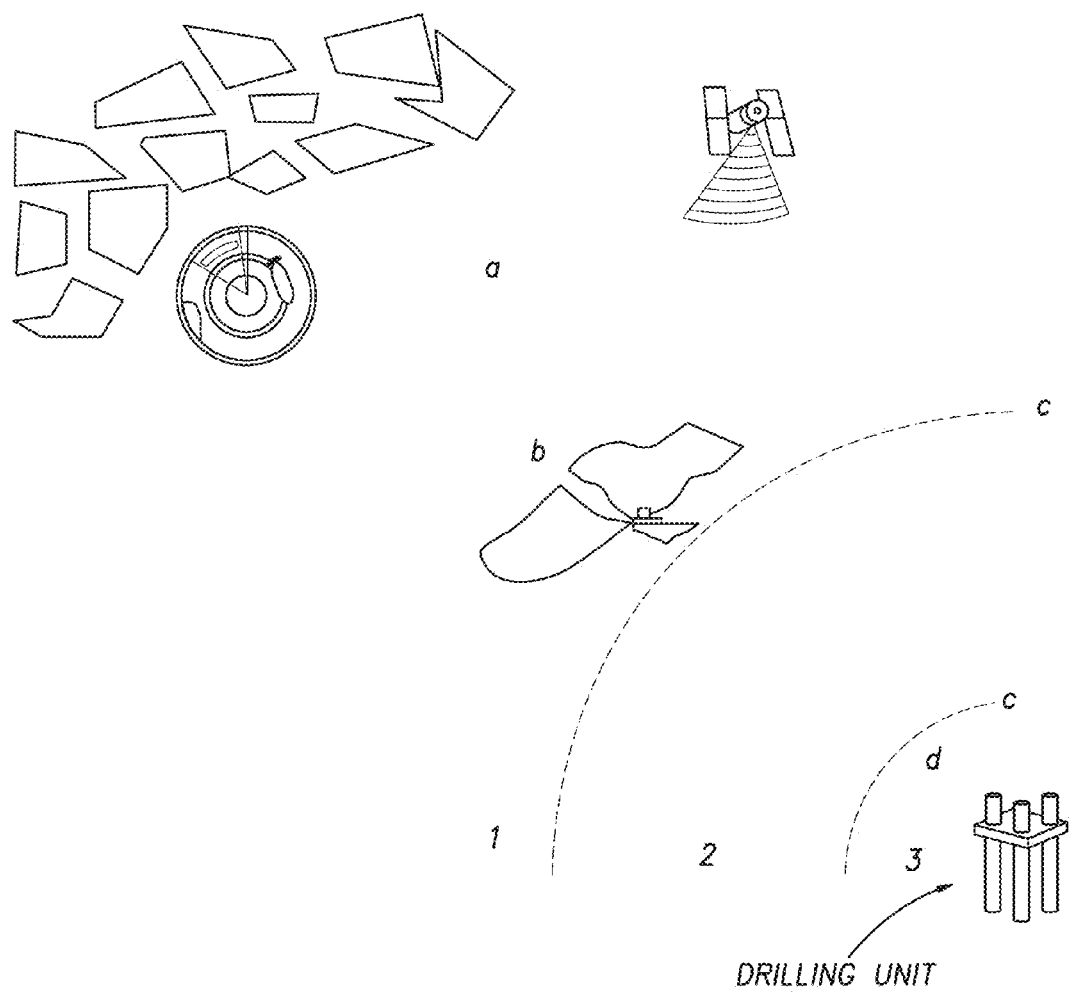
FIG. 1: Ice Floe Tracking System with Satellites.
Figure 2:
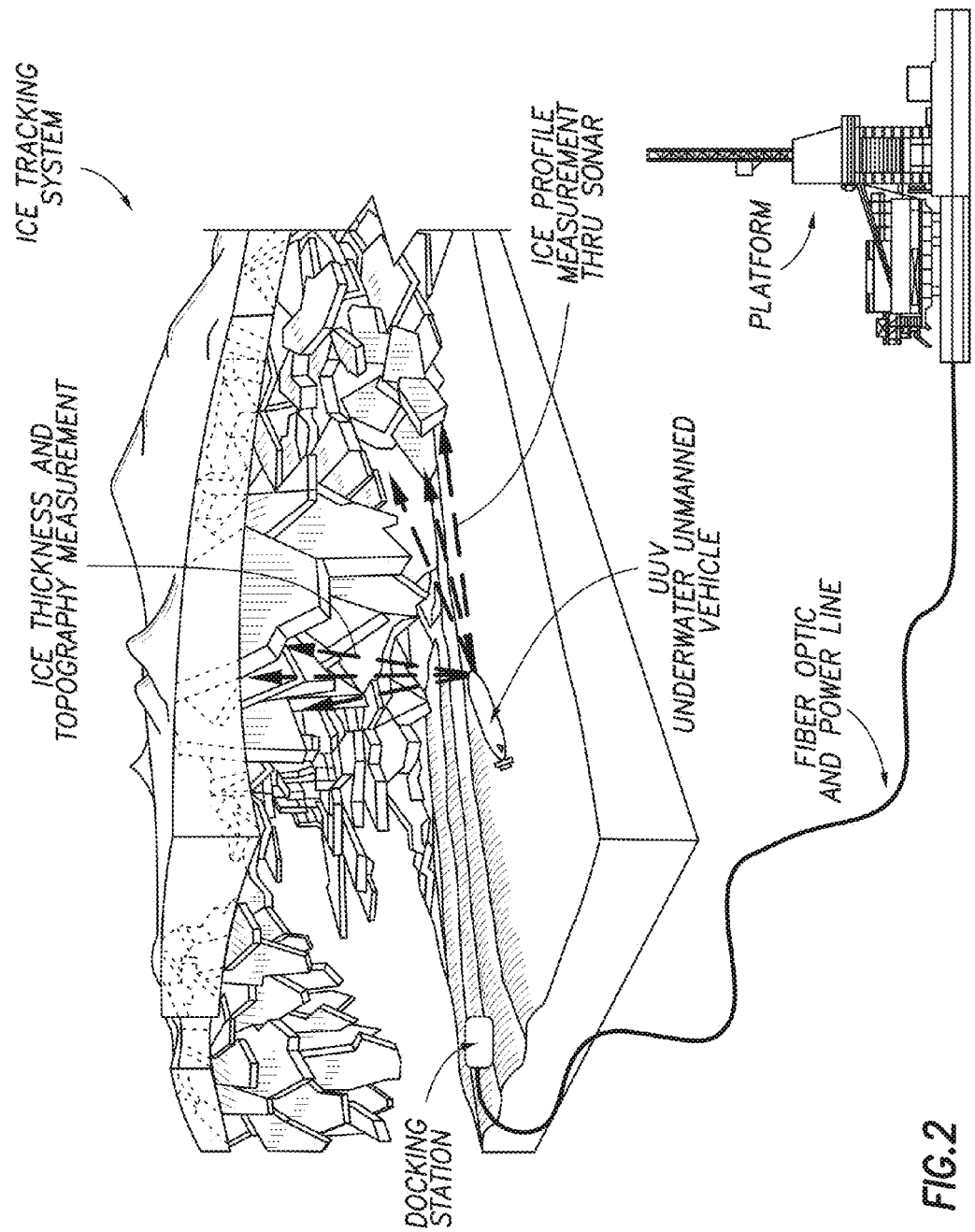
FIG. 2: Under Ice Profile and AUV.
Figure 3:
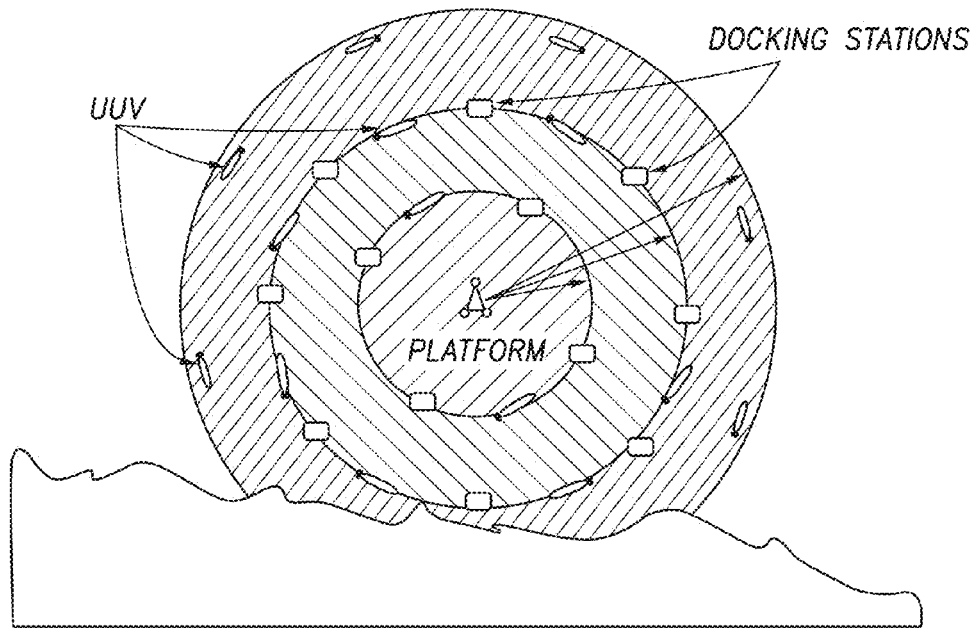
FIG. 3: Docking Stations and AUV's.

Underwater Unmanned Vehicles (UUV) also called autonomous underwater vehicles (AUV) can be used to image undersea topography across a large area (FIG. 2). AUV's are automated micro submarines anywhere from less than a foot to up to 20 feet or more in length (some larger AUV's may be 7 to 10 M in length and up to 3 meters in diameter). AUV's are battery powered and may have automated obstacle avoidance systems, on-board positioning systems, and sonar sensors to measure the time and distance between other AUV's and the underwater ice profile. They are automated in the sense that they are given instructions to follow a certain trajectory and come back. In one embodiment one or more AUV launch systems may be used including from the platform where the operation and drilling take place; from an ice breaker, barge or separate control ship that stays in the vicinity of the platform; or from fixed docking stations that reside on the sea-floor. Fixed docking stations may be laid on the sea floor, they may be tethered to underwater structures, or they may be tethered to the platform or control ship.

Previously AUV's were used to make detailed maps of the seafloor, construct and maintain subsea infrastructure including pipelines and sub sea completions in a cost effective manner with minimum disruption to the environment. AUV's are available from a variety of commercial and private sources including the REMUS 100 AUV from Woods Hole Oceanographic Institution and Hydroid, Inc.; the HUGIN 1000 and 3000 AUV's from Kongsberg Maritime and Norwegian Defence Research Establishment; the Bluefin Robotics 12 and 21 inch diameter vehicles, ALISTER AUV from ECA HYTEC™ and the International Submarine Engineering Ltd. Explorer, as well as vehicles by Lockheed-Martin, BlueView Technologies, Inc., Autonomous Undersea Systems Institute (AUSI), C & C Technologies, Cybernetics and others. AUV's may be constructed with various radar, sonar, laser, backscatter and upward looking systems for visualizing and mapping various underwater environments dependent upon available light, depth, water quality, and the weight and size of the AUV. Batteries may be developed to reduce the AUV weight or for longevity of the battery. As batteries improve by decreasing weight, increasing longevity, increasing the number of recharges and decreasing charge time, AUV surveys become longer, faster, and the area covered increases. AUV's may contain a variety of different functions including processors, antennae, global positioning systems (GPS), long term and short term data storage, removable media, camera, avoidance systems, location systems, echo-locators, homing systems, and the like.

An "ice floe" is a flat mass of ice floating in a body of water. Ice floes may include smaller floating ice structures such as icebergs, individual ice sheets, or groups of icebergs and ice sheets. Ice floes may also be larger masses such as ice fields. Ice floes may be thin sheets of ice or may be thicker pieces of ice with substantial underwater topography. Ice floes can vary in density from loosely packed snow accumulations to large thick sheets of dense fresh or salt water ice. Ice floes may originate from glaciers, larger ice fields, first year ice sheets, multi-year ice sheets and other ice sources. The identification of ice floes of different sizes is complicated as the amount of ice increases. Increasing ice coverage decreases the area visible to radar, satellite, and other imaging techniques. As ice coverage limits visibility the danger posed by large ice masses increases because reaction time is inhibited and available responses are restricted. Ice floe speed may also change the dangers posed by an ice floe. Typically, an ice floe travels slowly, exerting pressure due to constant movement and not rapid speed. Ice floes may not make detectable movements in packed ice or may move at up to 0.2 knots (approximately 0.23 mph or 0.37 km/h). In some embodiments an ice floe may move at greater than 0.4 knots (about 0.5 mph or 0.74 km/h) dependent upon the ocean currents, winds, shape of the ice floe, and other environmental factors.

Figure 4:
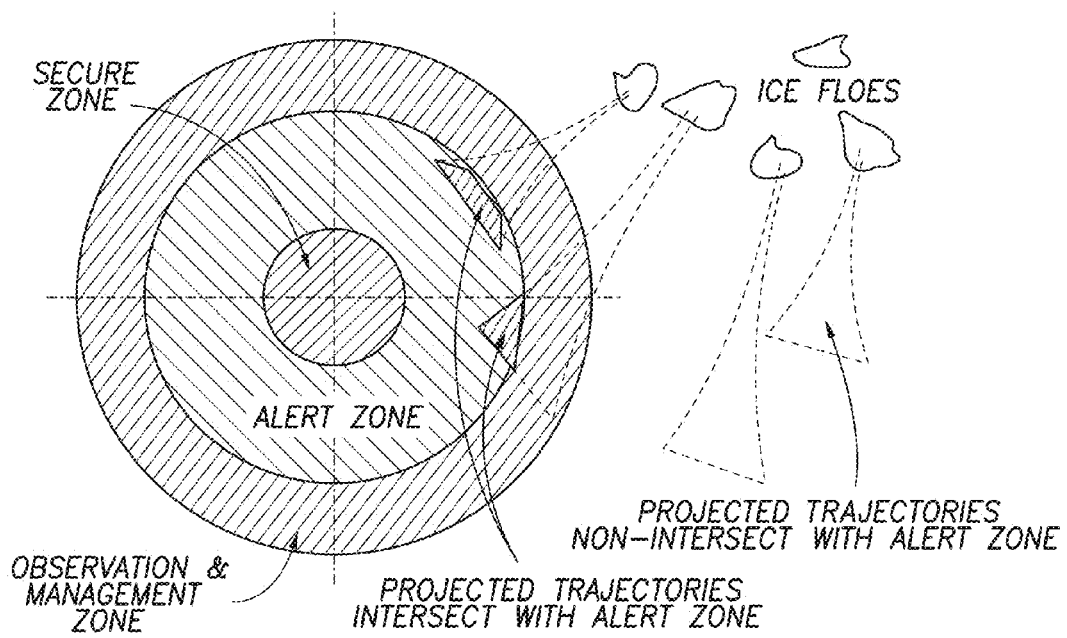
FIG. 4: Possible Direction "Cones" for ice-floes.
Figure 5:
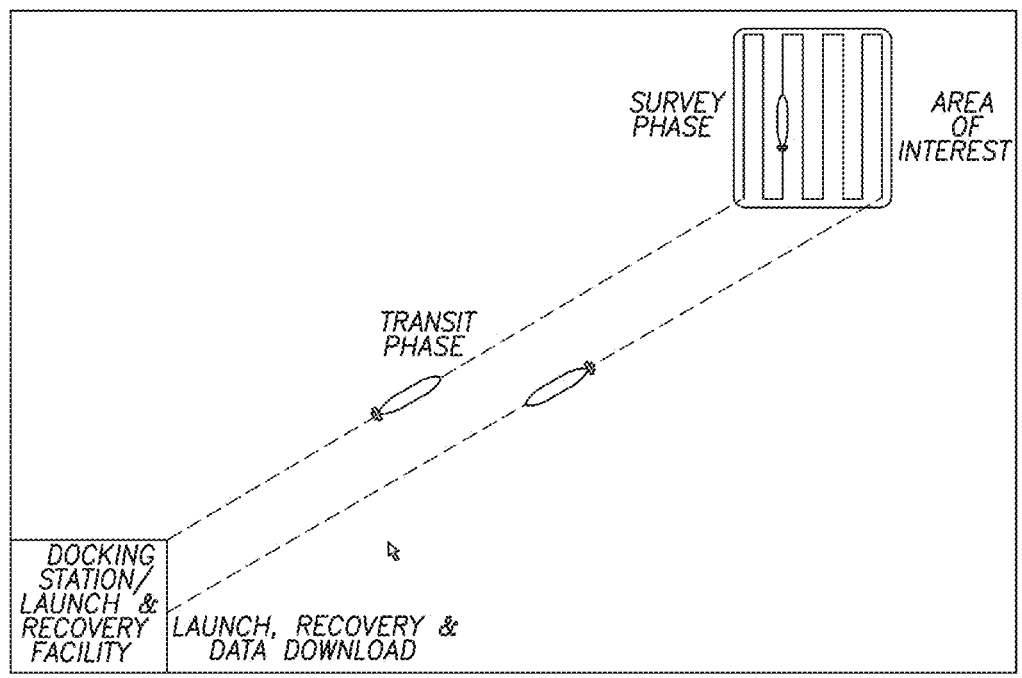
FIG. 5: Baseline Survey Mission (courtesy of Kongsberg).

Stresses in the ice floe may create different ridging and rafting patterns that may make the ice thicker or thinner in different areas. Pressure ridging, shear ridging, and fracturing may influence the ice formation and change the rheology of the ice floe. The ice floe topology must be analyzed to determine the thickness, density, properties, mass and overall threat of the ice floe to drilling structures, ships, ports, and other structures that may be on or exposed to sea ice. In FIG. 4 the probabilistic nature of the floe direction at one point in time is demonstrated. One can see that some floes can be discarded as they have very little or no possibility of entering the alert zone, and will not have sufficient time to impact the structure within the alert time, while some have to be tracked continuously because they may possibly or will probably impact the structure. Satellite imagery is used to identify ice floes and parts of ice floes and predict ice floe movement. The ice floes can be identified from satellite imagery, the area of the ice floe can be determined, the direction of travel can be estimated, and future trajectories can be predicted. The cones in FIG. 4 show possible ice floe direction based on satellite images and travel prediction algorithms. Time zero is set at the end of the summer when the first ice floes appear within a circle of 100 nautical miles of the platform.

Example thickness data from AUV's, together with a list of available SAR data, is shown in Table 1 below:

| Period | Lat | Lon | Deployment | Recovery |
|---|---|---|---|---|
| 2008-2009 | 70° 59.972' N | 165° 0.073' W | 9 Sep. 2008 | 28 Aug. 2009 |
| 2009-2010 | 70° 59.9510' N | 165° 0.134' W | 28 Aug. 2009 | 26 Jul. 2010 |

| Site 1 - Winter 2008-09 | | | | Available Imagery | |
|---|---|---|---|---|---|
| Date/Time | Max Draft (m) | Mean Draft (m) | Width (m) | TerrasarX | Rada rsat2 |
| Apr. 30 2009 11:02 | 26.42 | 16.09 | 299 | 4/14 and 5/03 | 4/27 and 5/01 |
| May 8 2009 13:26 | 26.18 | 14.45 | 242 | 5/3 and 5/11 | 5/08 |
| May 11 2009 2:11 | 25.83 | 15.73 | 76 | 5/11 | 5/11 |
| Apr. 30 2009 22:58 | 24.84 | 16.89 | 63 | 4/14 and 5/03 | 4/27 and 5/01 |
| May 12 2009 0:46 | 24.71 | 18.29 | 217 | 5/11 and 5/17 | 5/11 and 5/14 |
| Jun. 30 2009 5:05 | 23.66 | 14.97 | 164 | 6/27 and 7/08 | 6/29 and 7/01 |
| Apr. 1 2009 13:49 | 22.99 | 15.91 | 136 | 3/29 and 4/14 | 3/30 and 4/04 |
| May 10 2009 14:42 | 22.71 | 13.67 | 119 | 5/03 and 5/11 | 5/10 |
| Jun. 25 2009 1:04 | 22.63 | 15.61 | 162 | 6/22 and 6/27 | 6/25 |
| May 15 2009 1:34 | 21.99 | 13.04 | 139 | 5/11 and 5/17 | 5/14 |

| Site 1 - Winter 2009-10 | | | | | |
|---|---|---|---|---|---|
| Date/Time | Max Draft (m) | Mean Draft (m) | Width (m) | TerrasarX | Rada rsat2 |
| Mar. 12 2010 2:14 | 26.67 | 15.18 | 4 | 3/07 and 5/26 | 3/11 and 3/13 |
| Apr. 22 2010 13:22 | 26.25 | 18.89 | 40 | 3/07 and 5/26 | 4/25 |
| May 10 2010 10:32 | 25.18 | 16.62 | 67 | 3/07 and 5/26 | 5/10 |
| Mar. 6 2010 17:26 | 24.06 | 17.11 | 94 | 2/07 and 3/07 | 3/03 and 3/11 |
| May 5 2010 15:33 | 23.7 | 18.22 | 20 | 3/07 and 5/26 | 5/05 |
| Jun. 1 2010 8:41 | 22.51 | 12.09 | 355 | 5/26 and 6/03 | 6/03 |
| Apr. 22 2010 14:03 | 22.47 | 15.04 | 81 | 3/07 and 5/26 | 4/25 |
| Mar. 6 2010 9:17 | 22.17 | 14.79 | 81 | 2/07 and 3/07 | 3/03 and 3/11 |
| Mar. 16 2010 22:26 | 21.67 | 13.66 | 48 | 3/07 and 5/26 | 3/15 and 3/18 |
| Apr. 29 2010 4:06 | 21.51 | 15.25 | 43 | 3/07 and 5/26 | 4/28 |

Figure 6:
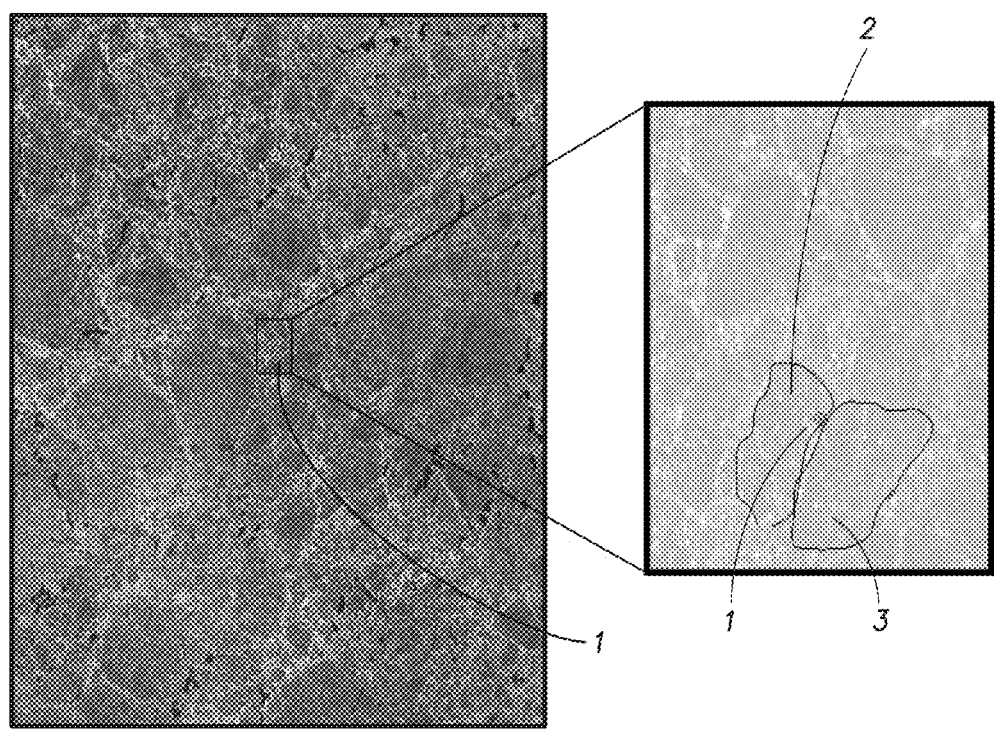
FIG. 6: Display showing SAR and ice thickness.

From this information, a potentially hazardous so-called keel of ice more than 26 m thick is identified and then correlated with an SAR image from the same time and place. The hazardous region can be identified using GPS techniques to within one or two meters. The region is displayed and can then be tracked on successive SAR images. This is shown in FIG. 6.

The keel is shown by the small shaded circle 1, which represents an area about 250 m across. The keel was formed by the collision of two ice floes 2, 3 marked on the image.

The system is associated with a rig or platform. The platform may be one of many different structures including a variety of drilling rigs, floating rigs, ship based rigs, jack-up rigs, fueling stations, floating platforms, docks, ports, temporary islands, artificial islands, shipping lanes, and the like. The platform may even contain multiple different structures that are fixed and floating with or without access and pipes between the different structures. Frequently, the platform may include a variety of vessels and structures including drilling ships or floating rigs, supply ships, chain ships or barges, one or more ice breakers, floating processing ships, ships or barges for drill cuttings and other wastes, and tankers to carry produced liquids or gases, as well as ships, platforms and barges that may serve multiple functions. Additionally, the barges or ships may be interchanged depending upon the weather, water conditions, ice floe dangers, type of well, processes being conducted and other factors that influence drilling.

Platforms are designed to resist a certain mass, thickness and velocity of ice floe dependent upon the design of the platform and environmental conditions. If however the platform were exposed to pressures above a certain threshold, personnel may be evacuated, pipelines flushed or shut down, drilling operations stopped, shutoff valves closed, and the like, so that no oil is spilled in the water or on the ice. In the case of jack-up rigs, the rig may be raised or lowered dependent upon the size of the approaching ice and danger posed to the drilling operations.

Ice breakers are ships designed to penetrate ice sheets and break up the ice flow. A variety of ice breakers are known that can break-up ice of varying thicknesses and densities. Dependent upon the type of ice and available ice breakers, one or more ice breakers may be used to break up, move or change the direction of the ice floe.

Zones around the structures may be measured in distance, time, or probability of collision. A variety of time, distance or other cautionary domains may be established either individually or in overlapping zones. As the risk of collision increases or the time before collision decreases, various actions may be undertaken including preventative actions, precautionary actions, shut-down, and evacuation. Zones may include observation zones, alert zones, safety zones, security zones and the like. In one embodiment, ice floes above a target size may be identified if they enter the "observation zone." This indicates further scrutiny where the ice floe is monitored for direction and speed. Risk of collision may be assessed after an ice floe enters the observation zone. The "alert zone" may be set up where specific responses are prescribed for ice floes that are identified entering the alert zone. A "secure zone" may be an area where actions are to be completed before an ice floe enters the secure zone.

Preventative measures, precautionary measures, and other actions may be undertaken in response to various positions and directions of movement of dangerously thick ice floes or thick areas or keels. Preventative measures may include activation of ice breakers to break-up or move ice floes, ice breaking buoys may be deployed, or the rig may be raised or lowered to better withstand the force of the ice. Precautionary measures may include shutting off and/or detaching drilling equipment, closing shutoff valves, staging for evacuation, and evacuation. Ice gear and safety equipment may be deployed if required or if a threat is present.

In closing, it should be noted that the discussion of any reference is not an admission that it is prior art to the present invention, especially any reference that may have a publication date after the priority date of this application. At the same time, each and every claim below is hereby incorporated into this detailed description or specification as additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 5,122,990, "Bottom Tracking System," Rowe-Deines Instr. Inc, Inv.: Deines (February 1991).
2. U.S. Pat. No. 5,381,694, "Ice Thickness Measurement Reflectometer," Dedicated Electronics, Inv.: Glynn (February 1992).
3. U.S. Pat. No. 5,585,799, "Microwave doppler radar system for detection and kinematic measurements of river ice," USA Dept. of Army, Inv.: Yankielun, (June 1995).
4. U.S. Pat. No. 6,700,528, US2003034912, "Motion detection and alerting system," USA Dept. of Army, Inv.: Williams, (September 2002).
5. U.S. Pat. No. 7,095,359, US2004143395, WO03048803, "Method of observing sea ice," Nat Inst Inf & Comm. Tech., Inv.: Matsuoka (November 2001).
6. GB2223642, "Tracking sea ice," Marconi Gec Ltd, Inv.: Johnson (October 1988).
7. Harms, et al., "AWI moored ULS data, Weddell Sea (1990-1998)." Boulder, Colo.: National Snow and Ice Data Center/World Data Center for Glaciology (2001).
8. Hyatt, et al., "Estimating sea-ice coverage, draft, and velocity in Marguerite Bay (Antarctica) using a subsurface moored upward-looking acoustic Doppler current profiler (ADCP)," Deep Sea Research Part II: Topical Studies in Oceanography, 55:351-64 (2008). http://dx.doi.org/10.1016/j.dsr2.2007.11.004.
9. Strass, "Measuring sea ice draft and coverage with moored UPWARD LOOKING SONAR's," Deep-Sea Res, I 45:795-818 (1998). doi:10.1016/S0967-0637(97)00065-4.
10. Theriault, et al., "Survey of Active Acoustic Monitoring (AAM) Technologies." Int'l Assoc. Oil & Gas Prod. (OGP) 1: (2009).
11. Wadhams, et al., "A new view of the underside of Arctic sea ice," Geophys. Res. Lett., 33, L04501, doi:10.1029/2005GL025131. (2006).

The invention claimed is:

1. A system for monitoring ice floe movement comprising:
 a) a satellite based system for acquiring SYNTHETIC APERTURE RADAR (SAR) images of ice floes;
 b) an underwater UPWARD LOOKING SONAR (ULS) system located in an autonomous underwater vehicle for acquiring ice thickness data; and
 c) a control unit for receiving and combining said SAR images and said thickness data by overlay of the ice thickness data on the SAR images in a single display to allow direct visualization of areas of ice having more than a threshold thickness which is a risk.

2. The system of claim 1, wherein said ULS system is a single beam system.

3. The system of claim 1, wherein said ULS system is a multi-beam system.

4. The system of claim 1, wherein said control unit is capable of tracking movement of hazardous ice floes, using both the thickness data and the SAR images from a first time interval and a later second time interval.

5. The system of claim 4, wherein the second time interval is less than six hours after the first time interval.

6. The system of claim 5, wherein the second time interval is less than four hours after the first time interval.

7. The system of claim 1 wherein the ice thickness data covers a two-dimensional area of the ice overlayed on one of the SAR images.

8. The system of claim 1 wherein the display comprises images from SAR with one or more areas indicated by color or shading as being an area in which the ice has more than the threshold thickness.

9. A process for monitoring ice floe movement comprising:
 a) receiving ice floe image data from a satellite based SAR system;
 b) receiving ice thickness data from an underwater ULS system located in an autonomous underwater vehicle;
 c) displaying a combination of the image data from the SAR system overlaid with the ice thickness data in a single display to allow direct visualization of ice floes having areas of more than a threshold thickness which is a risk.

10. The process of claim 9, including hazardous ice floes having areas of the threshold thickness and tracking movement of said floes using both the thickness data and the image data from a first time interval and a later second time interval.

11. The process of claim 9 wherein the ice thickness data from a two-dimensional coverage of the ice by the ULS system is overlaid on a single SAR image.

12. The process of claim 9 wherein images from the SAR system are displayed with one or more areas indicated by color or shading as being an area in which the ice has more than the threshold thickness.

* * * * *